US009943872B2

(12) United States Patent
Lenhardt (10) Patent No.: US 9,943,872 B2
(45) Date of Patent: Apr. 17, 2018

(54) APPARATUS FOR RECONFIGURING SPRAY EQUIPMENT, AND METHOD (71) Applicant: Theodore F. Lenhardt, Winter Garden, FL (US)

(72) Inventor: Theodore F. Lenhardt, Winter Garden, FL (US)

(73) Assignee: AGRICULTURAL MAGNETICS, LTD., Dublin (IE)

( * ) Notice: Subject to any disclaimer, the term of this patent is extended or adjusted under 35 U.S.C. 154(b) by 139 days.

(21) Appl. No.: 13/828,787

(22) Filed: Mar. 14, 2013

(65) Prior Publication Data
US 2014/0263696 A1 Sep. 18, 2014

(51) Int. Cl.
*A01G 25/00* (2006.01)
*B05B 17/06* (2006.01)
*A01G 25/16* (2006.01)
*B05B 1/20* (2006.01)
*A01M 7/00* (2006.01)

(52) U.S. Cl.
CPC .......... *B05B 17/0607* (2013.01); *A01G 25/00* (2013.01); *A01G 25/16* (2013.01); *A01M 7/0042* (2013.01); *B05B 1/20* (2013.01)

(58) Field of Classification Search
CPC ....... B05B 17/0607; B05B 1/20; A01G 25/00; A01G 25/16; A01M 7/0042
See application file for complete search history.

(56) References Cited

U.S. PATENT DOCUMENTS

| 2,652,925 A | 9/1953 | Vermeiren et al. |
| 4,265,754 A | 5/1981 | Menold |
| 4,265,755 A | 5/1981 | Zimmerman |
| 4,265,756 A | 5/1981 | Schiesser |

(Continued)

FOREIGN PATENT DOCUMENTS

SU    1217788    3/1986

OTHER PUBLICATIONS

Kunzhen et al., "Effect of Magnetized Water on Esterase Isozymes in the Leaves of Tomto Plant [J]." Acta Botanica Boreali-Occidentalia Sinica 2 (1994).

(Continued)

*Primary Examiner* — Arthur O Hall
*Assistant Examiner* — Tuongminh Pham
(74) *Attorney, Agent, or Firm* — Berenato & White, LLC (57) ABSTRACT An apparatus for configuring dispersing equipment for applying liquid solutions to vegetation, comprising: a plurality of nozzles for dispersing liquid in the form of liquid droplets; a plurality of magnets for applying a magnetic field to the liquid droplets; where the nozzles are configured to produce liquid droplets sized less than 400 microns and preferably less than 150 microns and more preferably within the range of 10 microns to 50 microns; where each magnet in the plurality of magnets has a magnetic remanence of at least 0.9 and preferably at least 1.25; where the plurality of magnets are moveably mountable on the spray equipment to vary the field strength and polar orientation to adapt for application conditions and purposes; where the liquid solution includes at least water, and where the nozzles are positionable to produce air turbulence and a spray cloud consisting of liquid droplets impacting target vegetation during spraying.

17 Claims, 6 Drawing Sheets

(56) References Cited

U.S. PATENT DOCUMENTS

| | | | |
|---|---|---|---|
| 4,605,498 | A | 8/1986 | Kulish |
| 4,711,271 | A | 12/1987 | Weisenbarger et al. |
| 4,842,195 | A * | 6/1989 | Koll et al. ................. 239/1 |
| 5,009,791 | A * | 4/1991 | Lin et al. ................. 210/695 |
| 6,056,872 | A | 5/2000 | Glass |
| 6,206,301 | B1 * | 3/2001 | Pruett ............... B05B 15/0208 239/116 |
| 6,276,617 | B1 * | 8/2001 | Lenhardt ................. 239/590 |
| 6,641,725 | B1 | 4/2003 | Barnes |
| 2010/0252646 | A1 | 10/2010 | McCammack |

OTHER PUBLICATIONS

Xia et al., "Study on effect of magnetic field on cucumber seed." Journal-Shenyang Agricultural University 30.1 (1999): 24-26.

Gang et al., "Research on the Effect of Difference Upon Germination and Growth of Wheat with Different Resistance in the Treatment of Magnetic Fields [J]." Agricultural Reseach in the Arid Areas 2 (1995).

Xia et al., "Effect of magnetic treatment seed of tomato on seed viability and seedling growth." Journal of Northeast Normal University (Natural Sciences Edition) 3 (1999): 66.

Bao et al., "The Study on Change of Physiology and Biochemistry of Cauliflower Seeds in Vivo After Magnetic Treatment." Journal of Inner Mongolia Agricultural University (Natural Science Edition) 1 (2010): 026.

Zhu, J., et al. "Biological effect on the germination and growth of mung bean seeds under low frequency magnetic field." Acta Botanica Boreali-occidentalia Sinica 23.5 (2003): 792.

Yanli et al, "Wu Liyan Department of Soil Sience, Shenyang Agricultural University; Effect of Magnetic Field on Wheat and Rice Crowth [J]." Journal of Shenyang Agricultural University 2 (1993).

Fan et al. "Effects of the Different Magnetic Field Treatments on the Physiology Characteristic of Several Plants." Journal—Shanxi University Natural Science Edition 30.1 (2007): 98.

Zheng et al., "Effect of magnetic treatment on seed germination and photosynthetic characteristics of wheat." Journal of Triticeae Crops 30.1 (2009): 79-82.

Xiao-Ju et al., "Study on the effect of tomato seeds physiology and biochemistry with magnetic field treatment." Bulletin Botanical Res 99 (1999): 1-8.

Heping et al., The Initial Study on the Influence of Magnetized Water to Vegetable Seed Germinating, Department of Agronomy, Xiaogan University, Hubei 432000.

Xi et al. "Effect of external magnetic field on peroxidase synthesis and its activation during germination in wheat", Journal of Plant Physiology and Molecular Biology, Catalog 2 (1993).

Wang et al., "Effects of Electro-Magnetic Field on the Physiological Characteristics of Chlorella vulgaris and Mechanisms Analysis [J]." Fisheries Science 7 (2005): 004.

Xiao et al., "The effect of magnetized water on seed germination and physiologic norm of balsam pera." Biomagnetism 4 (2004): 7-10.

Linnan et al., "Biological effects of constant magnetic field on wheat seeds." Journal of Southwest Agricultural University 16.4 (1994): 406.

Luo et al., Effect of 0.2 T Constant Magnetic Fields on Wound Healing in Rabbits; 1Department of Military Medical Equipment & Metrology, School of Biomedical Engineering, 2Department of Chemistry, School of Basic Medicine, 4Nursing School, Fourth Military Medical University, Xi'an 710033, China, 3Shaanxi Zhongbang Pharmaceutical Science and Technology Co., Ltd, Xi'an 710001, China.

Yin et al., "Effect of magnetic field with different strengths on the free radical concentration in Sesamum indicum seeds." Chinese Journal of Eco-Agriculture 14.1 (2006): 51-53.

Chi et al., Effects of High Intensity Pulsed Electric Field on Germination of Old Egglant Seeds; 1.College of Biology and Agricultural Engineering,Jilin University,Changchun,Jilin 130022,China;2.Department of Horticulture,Jilin Agricultural University,Changchun,Jilin 130118,China.

Suwen et al., "Influence of external magnetic field on lipid peroxidation in corn seedings." Journal of Shaanxi Normal University (Natural Science Edition) 24.3 (1996): 79.

Gu et al., "Effects of Soil Magnetization on Defensive Enzymes in Rape Plants [J]." Journal of Basic Science and Engineering 3 (2002): 006.

Gu et al., "Effects of Soil Magnetization on Drought-resistibility of Rape (Brassica campestris) and Their Mechanisms [J]." Journal of Basic Science and Engineering 1 (2003): 003.

Maheshwari et al., "Magnetic treatment of irrigation water: Its effects on vegetable crop yield and water productivity." Agricultural water management 96.8 (2009): 1229-1236.

Mostafazadeh-Fard et al., "Effects of magnetized water and irrigation water salinity on soil moisture distribution in trickle irrigation." Journal of Irrigation and Drainage Engineering 137.6 (2010): 398-402.

Selim et al., "Physio-anatomical responses of drought stressed tomato plants to magnetic field." Acta Astronautica 69.7 (2011): 387-396.

Tayari et al., Effect of Tillage Methods and Use Magnetic Water on Greenhouse Curcumber Yield in North of Khuzestan, Iran, Department of Agricultural, Islamic Azad University, Shoushtar Branch , Shoushtar ,Iran and Department of Agricultural Mechanization, Islamic Azad University, Shoushtar Branch ,Shoushtar , Iran.

About Mono-Pole Magnetism, Magnetizer Industrial Technologies, Inc., Pipersville, Pennsylvania.

Lin et al., Magnetic Treatment of Water and Its Application to Agriculture, Israel Institute of Technology.

* cited by examiner

FIG. 1

FIG. 2

Spray cloud out

16

Liquid in

APPARATUS FOR RECONFIGURING SPRAY EQUIPMENT, AND METHOD

BACKGROUND OF THE INVENTION

1. Field of the Invention

The present invention relates to systems and methods for applying liquids to vegetation and, more particularly, to such systems and methods employing liquids under pressure through a nozzle or emitter.

2. Background of the Invention and Related Art

Irrigated crops are a critical component in securing global food production. Globally, foods produced from irrigated crops comprise approximately 40% of world production. Sustaining the level of irrigation needed requires large amounts of water withdrawn from rivers, lakes, reservoirs, and groundwater. All together, crop irrigation makes up about 70% of global water withdrawals. Wherever access to surface water is limited and productive aquifers are available, groundwater provides the main source of irrigation water. In recent decades, the rate at which humans worldwide are pumping dry the vast underground stores of water that billions depend on has more than doubled—*ScienceDaily* (Sep. 23, 2010). When groundwater abstraction exceeds the recharge rate over extensive areas for prolonged periods, non-renewable groundwater depletion will result leading to falling groundwater levels.

Regional studies using the GRACE (Gravity Recovery And Climate Experiment) satellite observation revealed that considerable amounts of non-renewable groundwater resources are being abstracted in North East India, North West Pakistan, and California's Central Valley, most of which is used for irrigation—(*Nature*, Vol. 460, pp. 999-1002). Further studies also reported depleting groundwater resources due to irrigation in the High Plains (Ogallala) aquifer, USA—(*Geophysical Research Letters*, Vol. 38, L03403). Similarly, abstraction of groundwater resources at unsustainable levels is ongoing in areas of the Middle East, Africa, Australia, and China (*Geophysical Research Letters*, Vol. 37, L20402).

Published research has widely reported beneficial effects on crop yield when irrigation water solutions are exposed to magnetic fields, resulting in more efficient use of available water resources (e.g., Irrigation with magnetized water enhances growth, chemical constituent and yield of chickpea (*Cicer arietinum* L.), Mahmoud Hozayn1* and Amira Mohamed Saeed Abdul Qados; Agronomy Dept., Agric. and Biol. Div., National Research Centre, El-Bohoth St., 12622 Dokki, Cairo, Egypt). Spray equipment is used widely in irrigation systems to deliver water solutions to crops. Research has demonstrated that better results are achieved when a magnetic field of sufficient strength is applied as close as possible to the spray nozzle and in direct contact with the liquid pathway, as ta EFFECT OF EXTERNAL MAGNETIC FIELD ON PEROXIDASE SYNTHESIS AND ITS ACTIVATION DURING GERMINATION IN WHEAT; XI Gang; FU Zhi-Dong Northupestern Agricultural University, Yangling, Shaanixi 712100

EFFECTS OF ELECTRO-MAGNETIC FIELD ON THE PHYSIOLOGICAL CHARACTERISTICS OF CHLORELLA VULGARIS AND MECHANISMS ANALYSIS; WANG Hai-ying1, ZENG Xiao-bo2, GUO Si-yuan3 (1. College of Chemistry and Life Science, South-Central University for Nationalities, Wuhan 430074, China; 2. College of Pharmacy, Wuhan University, Wuhan 430072, China; 3. College of Food & Biological Engineering, South China University of Technology, Guangzhou 510640, China)

THE EFFECT OF MAGNETIZED WATER ON SEED GERMINATION AND PHYSIOLOGIC NORM OF BALSAM PERA; XIAO Wang, WANG Yu-ling, GUAN Zhi-qiong Depantment of Biology, Guangdong Education Institute, Guangzhou 510310

EFFECTS OF SOIL MAGNETIZATION ON DEFENSIVE ENZYMES IN RAPE PLANTS; GU Jiguang, ZHOU Qixing (Key Laboratory of Terrestrial Ecological Process, Institute of Applid Ecology, Chinese Academy of Sciences, Shenyang 110016).

EFFECTS OF SOIL MAGNETIZATION ON DROUGHT-RESISTIBILITY OF RAPE (BRASSICA CAMPESTRIS) AND THEIR MECHANISMS; GU Jiguang, ZHOU Qixing (Key Laboratory of Terrestrial Ecological Process, Institute of Applied Ecology, Chinese Academy of Sciences, Shenyang 110016).

MAGNETIC TREATMENT OF IRRIGATION WATER: ITS EFFECTS ON VEGETABLE CROP YIELD AND WATER PRODUCTIVITY; Basant L. Maheshwari, Harsharn Singh Grewal, School of Natural Science, CRC for Irrigation Futures, Building H3—Hawkesbury Campus, University of Western Sydney, Locked Bag 1797, Penrith South DC NSW 1797, Australia.

EFFECTS OF MAGNETIZED WATER ON THE DISTRIBUTION PATTERN OF SOIL WATER WITH RESPECT TO TIME IN TRICKLE IRRIGATION; M. Khoshravesh, B. Mostafazadeh-Fard, S. F. Mousavi & A. R. Kiani, Water Engineering Department, College of Agriculture, Isfahan University of Technology, Isfahan 84156-83111, Iran, and Gorgan Agricultural and Natural Resources Research Center, Gorgan 41996-13475, Iran.

PHYSIO-ANATOMICAL RESPONSES OF DROUGHT STRESSED TOMATO PLANTS TO MAGNETIC FIELD; Abdel-Fattah Hassan Selim, Mohamed Fathi EI-Nady; Department of Agricultural Botany, Faculty of Agriculture, Menufiya University, Egypt, Department of Agricultural Botany, Faculty of Agriculture, Kafrelsheikh University, Egypt.

EFFECT OF TILLAGE METHODS AND USE MAGNETIC WATER ON GREENHOUSE CURCUMBER YIELD IN NORTH OF KHUZESTAN, IRAN; Elham Tayari and Amin Reza jamshidi; Department of Agricultural, Islamic Azad University, Shoushtar Branch, Shoushtar, Iran and Department of Agricultural Mechanization, Islamic Azad University, Shoushtar Branch, Shoushtar, Iran.

Magnetizer Industrial Technologies, Inc. (Pipersville, Pa.) offers a clamp-on product called "Crop Booster" directed to magnetic treatment of water in irrigation systems. Applicant is aware of the following published work reporting study results related to use of the "Crop Booster" product: MAGNETIC TREATMENT OF WATER AND ITS APPLICATION TO AGRICULTURE; Study by Dr. Israel J. Lin and Jacob Yotvat, Israel Institute of Technology Israel Institute of Technology.

SUMMARY OF THE INVENTION

In a broad aspect, the present invention is directed to an apparatus, method and system for configuring dispersing equipment for applying liquid solutions to vegetation at least in the form of a spray, drip, and seep. Hereafter, quantification of remanence should be interpreted to be measured in Teslas.

In one broad aspect, a system for applying liquid solutions to vegetation is provided comprising at least one emitter for applying liquid in the form liquid droplets; at least one magnet for applying a magnetic field positioned in close proximity the exit point of the liquid droplets from the at least one emitter. The at least one magnet has a magnetic remanence of at least 0.9 and may be moveably mountable to vary the field strength and polar orientation. The liquid solution includes at least water, and magnetized liquid droplets are dispersed from the at least one emitter and impact the vegetation.

In another broad aspect, the apparatus includes a plurality of nozzles or emitters for dispersing liquid in the form of liquid droplets, and a plurality of magnets for applying a magnetic field to the liquid droplets. The nozzles may be configured to produce liquid droplets of any size and preferably less than 150 microns. For many applications liquid droplets within the range of 10 microns to 50 microns may be preferred and produced. Each magnet in the plurality of magnets has a magnetic remanence of at least 0.9 and preferably at least 1.25, and may be moveably mountable on the spray equipment to vary the field strength and polar orientation to adapt for application conditions and purposes. The magnets are positionable preferably close to points of the liquid exit from the dispersing equipment. The nozzles are positionable to produce air turbulence and a spray cloud consisting of liquid droplets impacting vegetation during spraying. The liquid solution includes at least water.

In another aspect of the present invention, liquid droplets are magnetized by the magnetic field of the plurality of magnets, and the polar orientation creates one of a substantially north or south monopole effect separating the liquid droplets by mutual repulsion.

In another aspect of the present invention, the magnets are corrosion resistant magnets and the nozzles further comprise bar or circular shaped magnets and the magnets preferably have a magnetic remanence of at least 0.9 and preferably at least 1.25.

In another aspect of the present invention, the nozzles and the magnets are adaptable for all types of liquid spray, drip, or seep applicators including at least irrigation emitters and sprayers, boom sprayers, backpack sprayers, airplane mounted sprayers, air-carrier sprayers, drip irrigation, micro-sprinklers, and foggers.

In another aspect of the present invention, magnets are positionable substantially adjacent to the nozzles when mounted on the liquid spray applicators.

In another aspect of the present invention, the plurality of nozzles are attachable to the sprayer with rotation point connectors to enable repositioning of spray angle of the nozzles to create air turbulence impacting the vegetation.

In another aspect of the present invention, magnetized liquid droplets are formed by collective dipole effects into a cloud attractive to the sprayed vegetation and the liquid droplets penetrate microhabitat in the vegetation, limit spray drift, and when chemicals are included in the liquid solution diminish leaf burn.

In another aspect of the present invention, the magnets are Neodymium rare earth magnets and preferably have a magnetic remanence of at least 0.9 and preferably at least 1.25.

In another aspect of the present invention, the magnets are composite magnets including ceramics and preferably have a magnetic remanence of at least 0.9 and preferably at least 1.25.

In another aspect of the present invention, the apparatus includes a single nozzle for dispersing liquid in the form of liquid droplets, and at least one magnet for applying a magnetic field to the liquid droplets.

The present invention provides a method for configuring dispersing equipment for applying liquid solutions to vegetation. The method includes providing reconfiguration components including at least a plurality of nozzles for dispersing liquid and a plurality of magnets for applying a magnetic field to the liquid solution. The nozzles may produce liquid droplets of any size and preferably less than 150 microns. In many applications, the liquid droplets produced may preferably be within the range of 10 microns to 50 microns. Each magnet in the plurality of magnets has a magnetic remanence of at least 0.9 and preferably at least 1.25, and may be moveably mountable on said disbursing equipment to vary the field strength and polar orientation to adapt for application conditions and purposes. The magnets are positionable preferably close to points of the liquid exit from the dispersing equipment. The nozzles are positionable to produce air turbulence impacting said vegetation during spraying. The liquid solution to be sprayed includes at least water.

In another aspect of the method, configuration components are installed on the liquid dispersing equipment, said components comprising at least magnets and nozzles.

In another aspect of the method, liquid droplets are magnetized by the magnetic field of the plurality of magnets and the polar orientation creates one of a substantially north or south monopole effect separating the liquid droplets by mutual repulsion.

In another aspect of the method, the magnets are corrosion resistant magnets and preferably have a magnetic remanence of at least 0.9 and preferably at least 1.25.

In another aspect of the method, the nozzles and magnets are adaptable for all types of liquid spray, drip, and seep applicators.

In another aspect of the method, the liquid applicators include irrigation emitters and sprayers, boom sprayers, backpack sprayers, airplane mounted sprayers, air-carrier sprayers, drip irrigation, micro-sprinklers, and foggers.

In another aspect of the method, the plurality of nozzles are attachable to the sprayer with rotation point connectors to enable repositioning of spray angle of the nozzles to create air turbulence impacting the sprayed vegetation.

In another aspect of the method, magnetized liquid droplets are sized to penetrate microhabitat in the vegetation, limit spray drift, and when chemicals are included in the liquid solution diminish leaf burn.

In another aspect of the method, the magnets are Neodymium rare earth magnets and preferably have a magnetic remanence of at least 0.9 and preferably at least 1.25.

In another aspect of the method, magnets are composite magnets including ceramics and any other magnetizable material, and preferably have a magnetic remanence of at least 0.9 and preferably at least 1.25.

The present invention provides a system for configuring dispersing equipment for applying liquid solutions to vegetation. The system may include a plurality of nozzles sized to produce liquid droplets of any size and preferably less than 150 microns, and for some applications preferably within the range of 10 microns to 50 microns. The system includes a plurality of magnets comprising one of Neodymium or composite ceramic magnets for applying a magnetic field to the liquid solution. Each magnet in the plurality of magnets has a magnetic remanence of at least 0.9 and preferably a magnetic remanence greater than 1.25. The plurality of magnets are moveably mountable on said dispersing equipment to vary the field strength and polar orientation to adapt for application conditions and purposes. The liquid droplets are magnetized by the magnetic field of the plurality of magnets. The magnets are positionable preferably close to points of liquid exit from the dispersing equipment. The plurality of nozzles is attachable to the dispersing equipment with rotation point connectors to enable repositioning of spray angle of the nozzles to create air turbulence impacting the vegetation. The liquid solution consists of at least water.

One aspect of the present invention is providing a system that incorporates magnets and magnetic nozzles into irrigation equipment to produce and magnetize small liquid droplets that will penetrate smaller spaces in sprayed vegetation (i.e., micro-habitat). Spraying with smaller droplets has been proven through various university studies to have many benefits. By reconfiguring irrigation equipment with preferred embodiments of the present invention, the magnetized liquid solution will be more attracted to the electromagnetic field of the vegetation to assist in overcoming spray drift that can occur when applying fine liquid droplets. The reduction of drift will reduce the waste of sprayed liquid solution. The continued magnetic effect will also benefit the better use of the sprayed vegetation. Although the invention magnetizes fine droplets, the invention can also be used to produce and magnetize coarse droplets with measurable benefits whether in the form of a spray, drip, or seep. However, best results are achieved when the present invention is utilized to produce fine magnetized liquid droplets and a turbulent mode of transport.

Magnetic influence is added to a spray solution to increase attraction and attachment to the plants, reduce water usage, enhance growth, improve drought tolerance, and assist in disease resistance in crops. Magnetic influence has also been found to help keep the lines, filters, and nozzles of the irrigation equipment from clogging (fouling of the lines). The effectiveness of this technology is maximized by use of magnets comprising materials exhibiting a high degree of remanence (i.e., ability of a material to retain magnetization equal to the magnetic flux density of the material after the removal of the magnetizing field); close proximity of magnetic influence to the exit point of the liquid solution from the nozzle; and use of a substantially produced monopole effect by configuring bar magnets facing each other with like poles or stringing several donut/tube magnets in the same direction with the poles on the end, or one long magnet with the poles on the ends. Advantages of the monopole effect include:

a. South polarity for increased growth and drought tolerance (the end marked North on a magnet attracted to the North Pole of the earth), and
 b. North polarity for disease resistance (the end marked South on a magnet—attracted to the South Pole of the earth).

Figure 1:
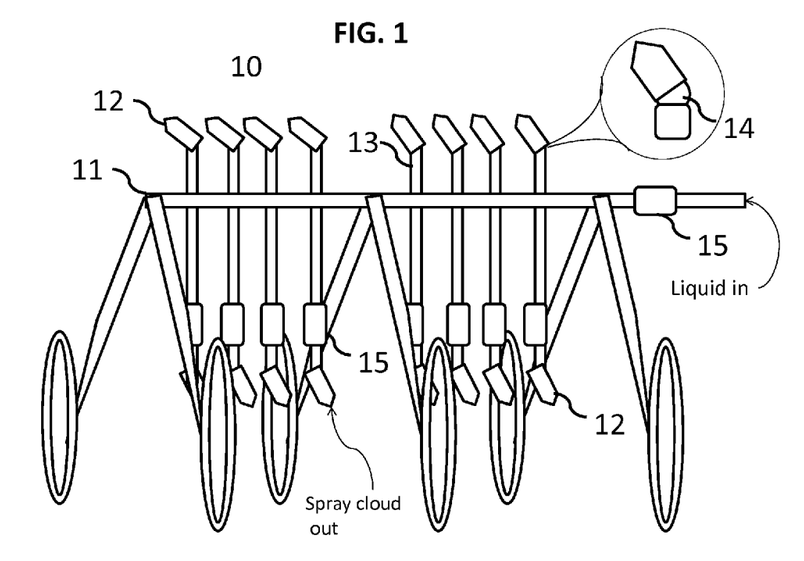

The substantial monopole effect can be provided using a multidirectional nozzle—same threads on each end so it can be reversed depending on what results are desired—or two different nozzles with opposite polarities. The substantially produced monopole effect is enhanced by closeness of the magnets to the irrigation liquid solution. In the related art, others place magnets on the outside of a thick pipe that causes a significant loss of magnetic influence. In the present invention, placing magnets in the pipe/tubing material or as part of the nozzle increases magnetic influence. This placement also protects the magnets from the outside environment and from erosion by the liquid passing through them, while maintaining a minimum of distance from the liquid flow.

In another aspect, the present invention may be adapted to drip or seep irrigation. This may be simply a pipe above or below ground with holes in it to allow water to drip or seep to the roots. Some growers use magnets at the source to assist in eliminating the clogging of the holes. In the present invention, the magnets are positioned in close proximity to the exit points of liquid. Therefore, by placing magnets periodically along the piping will increase the collective magnetic influence, time of exposure and closeness to the target vegetation. Trickle-nozzles incorporating magnets may be mounted in-line with said holes to produce magnetic influence in drip or seep water passing from the pipe through the trickle-nozzles into the ground.

The present invention is directed to achieving the following:

1. Lower application rates compared to conventional dispersing equipment and therefore reduced use of water and spray chemicals.
2. Increased droplet attraction and attachment compared to conventional spraying which results in reduced spray drift.
3. Smaller droplet size for improved systemic or non-systemic chemical application such as in the use of pesticides and fungicides, and improved chemical absorption for fertilizers which consequently produces increased growth and yield.
4. Application of a magnetized solution producing increased crop yield.
5. Spraying with small droplets to reduce leaf burn and therefore increase plant yield.
6. Application of a magnetized solution producing increased disease resistance.

Configuration of dispersing equipment used for agricultural, commercial, and residential irrigation applications in accordance with the present invention achieves these and other objectives.

BRIEF DESCRIPTION OF THE DRAWINGS

FIG. 1 is a non-limiting drawing showing how the apparatus of the present invention may be used to reconfigure pivot irrigation and track irrigation systems.

FIG. 2 is a non-limiting drawing showing how the apparatus of the present invention may be incorporated into a regular rain bird type of sprinkler, stationary sprinklers, moveable sprinklers, and popup sprinklers for golf courses, turf farms, lawns, nurseries, and commercial buildings.

FIG. 3 is a non-limiting drawing showing how the apparatus of the present invention may be incorporated into a spray nozzle.

FIG. 4 is a non-limiting drawing showing how the apparatus of the present invention may provide substantially either a South monopole effect or a North monopole effect.

FIG. 5 is a non-limiting drawing showing how the apparatus of the present invention may be incorporated into mobile spray equipment.

FIG. 6 is a non-limiting drawing showing how the apparatus of the present invention may be adapted to drip or seep irrigation.

DETAILED DESCRIPTION OF PREFERRED EMBODIMENTS OF THE INVENTION

In brief: FIG. 1 is a non-limiting drawing showing how the apparatus of the present invention may be used to reconfigure pivot irrigation and track irrigation systems. Pivot irrigation and track irrigation systems perform the same function, except that a pivot system moves in a circle and a track system moves in a straight line. The track irrigation system needs a feed line hose to follow it. Nozzles of the present invention are shown mounted at multiple exit points for the irrigation spray. The nozzles are mounted with rotable connectors enabling nozzle rotation for variation of spray angle to create air turbulence during spray operations.

FIG. 2 is a non-limiting drawing showing how the apparatus of the present invention may be incorporated into a typical “rain bird” type of sprinkler including at least one nozzle, and which sprinkler may roll around on a track/guide line or may be stationary for agricultural crops. In addition the apparatus of the present invention can be used in conjunction with but not limited to stationary sprinklers, moveable sprinklers, and popup sprinklers for golf courses, turf farms, lawns, nurseries, and commercial buildings.

FIG. 3 is a non-limiting drawing showing how the apparatus of the present invention may be incorporated into a spray nozzle. Magnets are shown placed in the pipe/tubing material as part of the nozzle which increases magnetic influence. This placement also protects the magnets from the outside environment and from erosion by the liquid passing through them, while maintaining a minimum of distance from the liquid flow.

FIG. 4 is a non-limiting drawing showing how the apparatus of the present invention may provide substantially either a South monopole effect or a North monopole effect. The South polarity produces increased growth, yield and drought tolerance in vegetation (the end marked North on a magnet). The North polarity produces greater disease resistance in vegetation (the end marked South on a magnet).

FIG. 5 is a non-limiting drawing showing how the apparatus of the present invention may be incorporated into mobile spray equipment. Spray equipment mounted on a truck, train, and airplane is depicted. The effectiveness of the present invention in reducing the amount of liquid solution needed to achieve the same or greater crop yield reduces the number of applications that may be required. Reducing the number of applications can result in significant energy savings and reduced carbon footprint, not only in the form of less vehicle fuel use, but in terms of less energy to pump ground water and produce petroleum based chemicals typically used in agriculture. Reduced energy use and lower carbon footprint may provide opportunities for receipt of carbon credits.

FIG. 6 is a non-limiting drawing showing how the apparatus of the present invention may be adapted to drip or seep irrigation. This configuration may be a pipe or other conduit for liquid positioned above or below ground where the pipe or conduit includes at least holes in it to allow water to drip or seep to vegetation roots.

In detail: Referring now to FIG. 1, there is shown a non-limiting schematic illustration of one embodiment of the present invention 10 illustrating how the apparatus of the present invention may be used to reconfigure pivot irrigation and track irrigation systems 11. Pivot irrigation and track irrigation systems are comprised of functionally similar components and perform essentially the same function, except that a pivot system moves in a circle and a track system moves in a straight line. The track irrigation system needs a feed line hose to follow it. Nozzles 12 of the present invention 10 are shown mounted at multiple exit points 13 for the irrigation spray liquid. The nozzles 12 are mounted with rotable connectors 14 enabling variation of spray angle to create air turbulence during spray operations. The nozzles 12 may include one or a plurality of magnets configured internally exposing primarily north or south polarity to the flow of liquid.

In one embodiment of the present invention, the apparatus includes a plurality of nozzles 12 for dispersing liquid in the form of liquid droplets, and a plurality of magnets (see FIG. 3) for applying a magnetic field to the liquid droplets. Additional magnets 15 may be mounted along the liquid pathway in close proximity to the nozzles 12. Additional magnets 15 strengthen the magnetic influence on the liquid solution to be sprayed. The nozzles 12 may be configured to produce liquid droplets of any size and preferably less than 150 microns. For many applications liquid droplets within the range of 10 microns to 50 microns may be preferred and produced. Each magnet 12 in the plurality of magnets has a magnetic remanence of at least 0.9 and preferably at least 1.25, and is moveably mountable on the spray equipment to vary the field strength and polar orientation relative to the liquid exit point to adapt for application conditions and purposes. The nozzles 12 are positionable to produce air turbulence and a spray cloud consisting of liquid droplets impacting vegetation during spraying. The liquid solution includes at least water.

Figure 2:
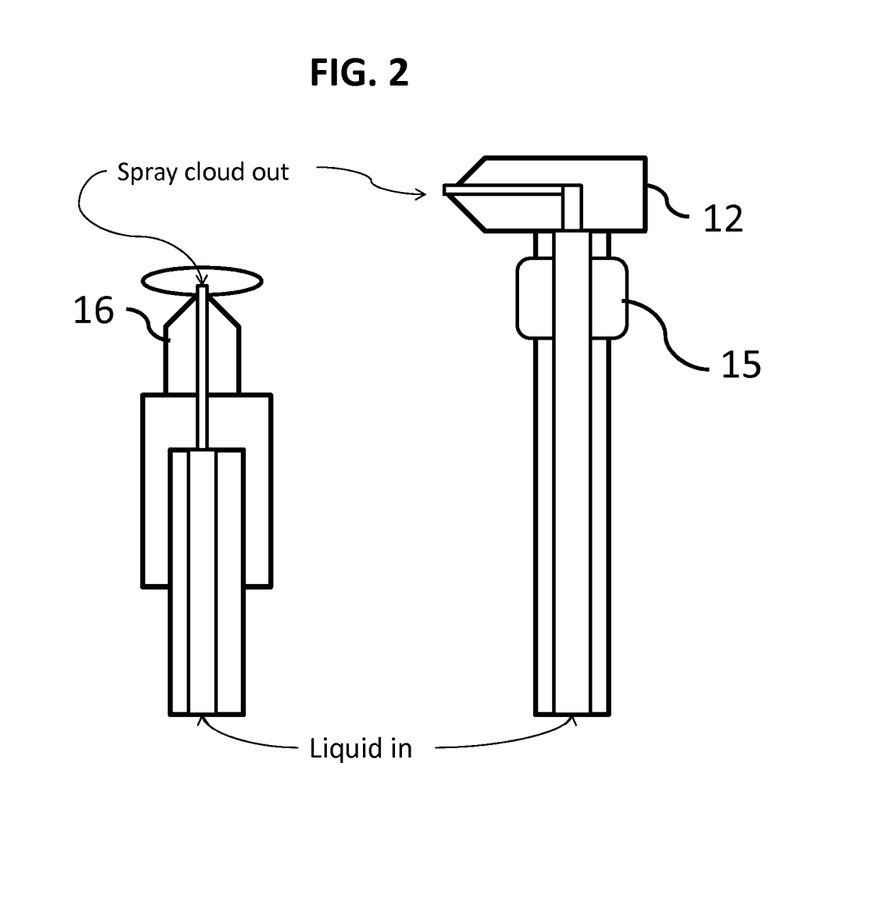

Referring now to FIG. 2, there is shown a non-limiting schematic illustration of one embodiment of the present invention showing how the apparatus of the present invention may be incorporated into a typical "rain bird" type of sprinkler 20 including at least one nozzle, and which sprinkler may roll around on a track/guide line or may be stationary for agricultural crops. The present invention may be adapted to incorporate magnets into nozzles for high-efficiency micro-sprinklers and pop-up sprinklers 16 as well. The nozzles 12 and the magnets 15 are adaptable for all types of liquid spray applicators including at least irrigation emitters and sprayers, boom sprayers, backpack sprayers, airplane mounted sprayers, air-carrier sprayers, drip irrigation, micro-sprinklers, and foggers. In another aspect of the present invention, magnets 15 are positionable substantially adjacent to the nozzles when mounted on the liquid spray applicators.

In addition the nozzles 12 and magnets 15 of the present invention may be used to reconfigure stationary sprinklers, moveable sprinklers, and popup sprinklers for at least golf courses, turf farms, lawns, nurseries, and commercial buildings.

Figure 3:
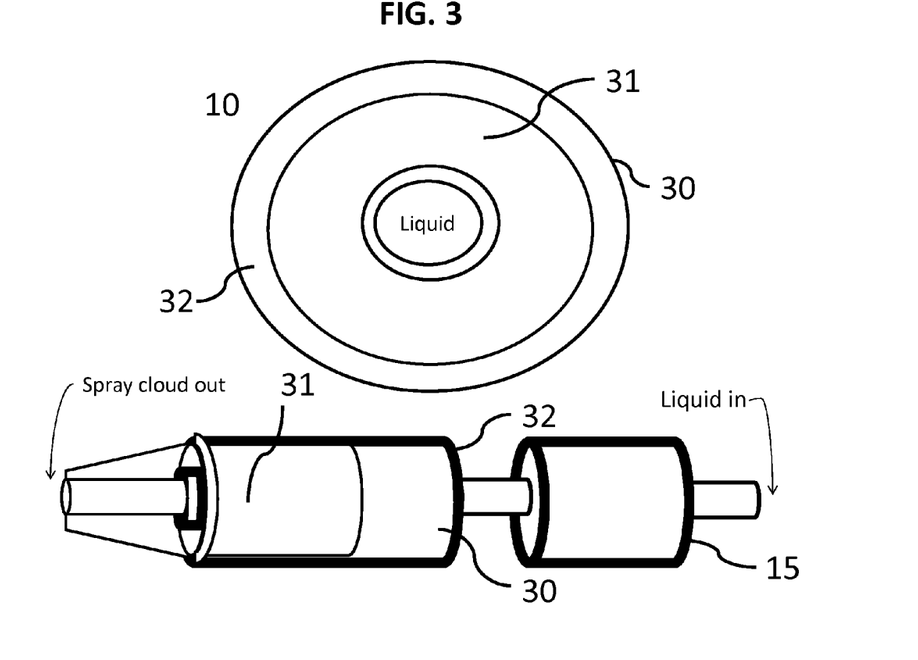

Referring now to FIG. 3, there is shown a non-limiting schematic illustration of one embodiment of the present invention showing how the apparatus 10 of the present invention may be incorporated into a spray nozzle 30. Magnets 31 are shown placed in the pipe/tubing material as part of the nozzle 30 which increases magnetic influence in the sprayed liquid. This placement also protects the magnets 31 from the outside environment and from erosion by the liquid passing through them, while maintaining a minimum of distance from the liquid flow.

In another aspect of the present invention, liquid droplets are magnetized by the magnetic field of the plurality of magnets 31 incorporated in the spray nozzle 30, and the polar orientation of the magnets 31 creates substantially one of a north or south monopole effect separating the liquid droplets in the spray by mutual repulsion. In another aspect of the present invention 10, magnetized liquid droplets are formed by collective dipole effects into a spray cloud (see FIG. 1, 16) attractive to the sprayed vegetation, and where the liquid droplets penetrate microhabitat in the vegetation, limit spray drift, and when chemicals are included in the liquid solution diminish leaf burn. Regardless whether the droplets have a dipole effect or a primarily monopole effect the cloud will always have a dipole nature which holds the droplets together. The monopole effect means that the droplets have a stronger one pole effect over the other pole yet both poles (dipole) are always present. The monopole effect causes a mutual repulsion between the droplets within the cloud, but the cloud with an overall dipole nature will keep the droplets within the cloud. The magnets 31 and 15 are corrosion resistant magnets and the nozzles 30 further comprise bar or circular shaped magnets and the magnets 31 and 15 have a magnetic remanence of at least 0.9 and preferably have a magnetic remanence of at least 1.25. The magnets 31 and 15 may be Neodymium rare earth magnets or composite magnets including ceramics, plastics or any other suitable material and have a magnetic remanence of at least 0.9 and preferably have a magnetic remanence of at least 1.25.

Figure 4:
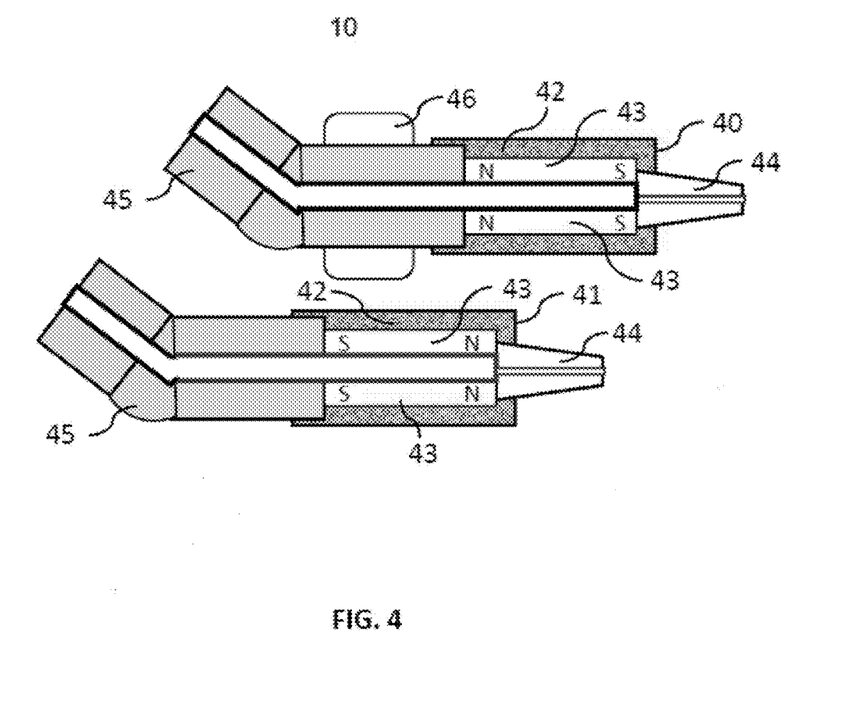

Referring now to FIG. 4, there is shown a non-limiting schematic illustration of one embodiment of the present invention showing how the apparatus 10 of the present invention may be configured with magnets 43 oriented to provide substantially either a South monopole effect nozzle 40 or a North monopole effect nozzle 41. The substantially South polarity effect 40 promotes increased growth and drought tolerance in vegetation (the end marked North on a magnet). The substantially North polarity effect 41 promotes greater disease resistance in vegetation (the end marked South on a magnet). The plurality of magnets of the present invention 10 is moveably mountable and positionable on a range of spray equipment [e.g. pivot irrigation and track irrigation systems 11 shown in FIG. 1] to produce variation in the field strength and polar orientation to adapt for specific application conditions and purposes. Other types of magnets and magnet configurations may be used including but not limited to radial magnets 46. The radial magnet is very strong with one pole on the inside diameter. However, the cost is higher than the typical tube, donut, and bar magnets. In addition, the nozzle can be constructed with threaded ends so that the magnets 43 are reversible and the nozzle can be configured for either a North or South polarity.

The nozzles of the present invention 10 comprising a containment 42, high remanence magnets 43, spray orifice 44, and at least one rotatable connector 45 are positionable to produce air turbulence and a spray cloud consisting of liquid droplets impacting vegetation during spraying. The liquid droplets experience mutual repulsion resulting from the monopole effect (one pole stronger than the other) which can only happen when the fluid is exposed to repelling magnetic forces or primarily one pole. The monopole effect produces a separation of the liquid droplets (due to mutual repulsion) for better consistent coverage of the sprayed liquid solution, especially with small (10 micron to 50 micron) droplets that are attracted to vegetation, that have added attachment to vegetation, and have a magnetic biological effect on the target vegetation. However, at the same time the spray cloud has both north and south polarity which helps to hold the droplets together in a fog. To clarify, the cloud stays together because of the dipole nature of magnetics but the liquid droplets within the cloud are repelled from one another due to the stronger pole influence. Each magnet 43 may have a magnetic remanence of at least 0.9 and preferably a magnetic remanence greater than 1.25. The substantial monopole effect can be provided using a multidirectional nozzle 40 or 41—same threads [48] on each end so it can be reversed depending on what results are desired—or two different nozzles 40 and 41 with opposite polarities. The substantially produced monopole effect is enhanced by closeness of the magnets 43 to the irrigation liquid solution. In the related art, others place magnets on the outside of a thick pipe that causes a significant loss of magnetic influence. In the present invention 10, placing magnets in the pipe/tubing material 42 or as part of the nozzle 40 or 41 increases magnetic influence. This placement also protects the magnets from the outside environment and from erosion by the liquid passing through them, while maintaining a minimum of distance from the liquid flow.

Figure 5:
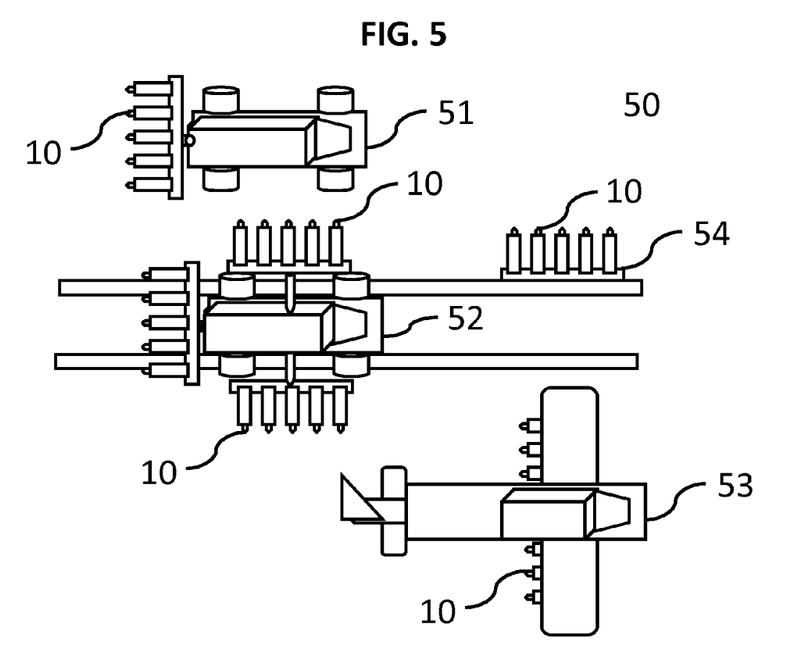

Referring now to FIG. 5, there is shown a non-limiting schematic illustration of one embodiment of the present invention showing how the apparatus of the present invention 10 may be incorporated into mobile spray equipment 50. Spray equipment mounted on a truck 51, train 52, and airplane 53 is depicted, along with irrigation using the railroad right of way or monorail beams 54. The effectiveness of the present invention 10 in reducing the amount of liquid solution needed to achieve the same or greater crop yield reduces the number of applications of liquid solution that may be required. Reducing the number of applications can result in significant energy savings and reduced carbon foot print, not only in the form of less vehicle fuel use, but in terms of less energy needed to pump ground water and to produce petroleum based chemicals typically used in agriculture. Reduced energy use and lower carbon footprint may provide opportunities for receipt of carbon credits.

The mobile spray equipment 50, as well as agricultural irrigation systems (see FIG. 1, 11) can be reconfigured using the present invention 10 for reconfiguring dispersing equipment 50 for applying liquid solutions to vegetation. The present invention 10 may provide a plurality of nozzles sized to produce liquid droplets of any size and preferably less than 150 microns. Some configurations may preferably produce liquid droplets within the range of 10 microns to 30 microns. Any number of magnets may be included comprising one of Neodymium, composite ceramic/plastic magnets, or other magnet material for applying a magnetic field to sprayed liquid solutions. Each nozzle in the plurality of nozzles may include at least one magnet (see FIG. 4, 43). Each magnet in the plurality of magnets may have a magnetic remanence of at least 0.9 and preferably a magnetic remanence greater than 1.25. The plurality of magnets is moveably mountable on the spray equipment 50 preferably close to the liquid exit point and such that the field strength may be varied and the polar orientation may be changed for specific application conditions and purposes. The present invention 10 may be used to apply liquid solutions as liquid droplets consisting of at least water and the liquid droplets are magnetized by the magnetic field of the plurality of magnets. The plurality of nozzles are attachable to the dispersing equipment 50 with rotation point connectors 55 to enable repositioning of spray angle of the nozzles to create air turbulence impacting target vegetation.

Figure 6:
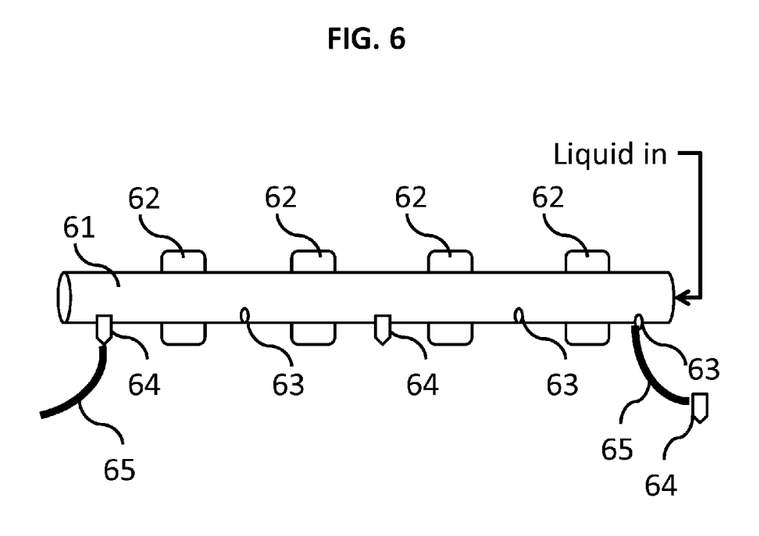

Referring now to FIG. 6 there is shown a non-limiting schematic illustration of one embodiment of the present invention 10 showing how the apparatus of the present invention 10 may be adapted to low flow volume irrigation systems including drip or seep irrigation. In this configuration a pipe 61 or other conduit 61 including both semi-rigid and flexible conduits for transporting liquid may be positioned above or below ground where the pipe 61 or conduit 61 includes magnets 62 and at least holes 63 as exit points to allow water to drip or seep to vegetation roots. Other permeable conduits 61 including drip tape may also incorporate a plurality of said magnets 62 periodically positioned internally or externally along the route of liquid flow. Examples of drip and seep irrigation includes piping and other conduits above or below ground with outlets periodically spaced under trees in orchards or groves that cause a drip or seepage to reach the root area. Magnets 62 are substantially positioned in close proximity to the points 63 where liquid exits from the pipe 61 or other conduit 61. Drip and seep irrigation also includes hydroponics where a drip, spray or mist receiving magnetic influence is applied to plants that are hanging in a greenhouse with the roots exposed. This enables a magnetic field to influence the entire plant including the roots.

In the present invention, the magnets 62 are generally positioned in close proximity to the exit points 63 of the liquid, however, the number of magnets and their positioning may vary depending upon the volume and composition of the liquid flowing, system configuration, and requirements of a particular application. Flow extenders 65 may be attached at the holes 63. Small magnetic trickle-nozzles 64 may be incorporated along the pipe 61 or other conduit 61, or position at the ends of flow extenders 65, where liquid may drip, seep, or spray through said nozzles 64 and gain magnetic influence. Flow extenders 65 may be attached to said nozzles 64. Placing magnets 62 periodically along the pipe 61 or conduit 61 will increase the collective magnetic influence, time of exposure and closeness to the target vegetation. Each magnet 62 and each trickle-nozzle 64 may have a magnetic remanence of at least 0.9 and preferably a magnetic remanence greater than 1.25. Trickle-nozzle 64 may further comprise any type of low flow volume emitter, including micro-sprinklers and foggers. Trickle-nozzles 64 may also comprise button drippers configured along the length of said pipe 61 or other conduit 61. Trickle nozzles 64 may comprise drippers providing a point of liquid exit and inserted internally into semi-rigid or flexible tubing providing for a flow of liquid. One non-limiting example of a low flow volume drip emitter includes a 0.5 or 1 GPH pressure compensating barbed dripper that lets a 0.5 or 1 GPH to flow in a range of pressure between 7 to 45 PSI.

It may be appreciated by one skilled in the art that additional embodiments and configurations may be contemplated, including other orientations of a magnet or plurality of magnets on the nozzle or along other portions of the line. Due to the cost of manufacturing, an inexpensive way to attach magnets to the outside of current irrigation system tubing is to use shrink wrap. Another method is to use mechanical clamps or adhesive tape. However, attached magnets still need to be positioned as close to the exit point as possible and configured to suite the desired effect.

Use of an electromagnet in order to increase the strength of a magnetic field that is possibly stronger than what can be produced with permanent (ex. rare earth) magnets is anticipated. However, electromagnetic technology has the disadvantages that it is relatively expensive, somewhat complicated, and requires significant maintenance. However, in the future other means to create a stronger magnetic field may be introduced and the use of such technology is anticipated.

This includes composite materials such as certain types of ceramics that may hold stronger magnetic fields and hold them longer than what is currently being used.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

I claim:

1. An apparatus for configuring dispersing equipment for applying liquid solutions to vegetation, comprising:
    at least one nozzle for dispersing liquid in the form of liquid droplets, said at least one nozzle comprising at least one magnet for applying a magnetic field to said liquid, said at least one magnet forming a tubing material part of said at least one nozzle such that the tubing material defines a tubular conduit in said at least one nozzle, wherein a polar orientation of said at least one magnet in the nozzle produces either a north or south monopole effect in the nozzle to separate said liquid droplets;
    a plurality of additional magnets for applying a magnetic field to said liquid droplets, each magnet in said at least one magnet and plurality of additional magnets having a magnetic remanence of at least 0.9 Tesla;
    wherein said plurality of additional magnets are moveably mountable on said dispersing equipment to vary the field strength, and
    wherein said liquid includes at least water, and further comprising:
    a rotatable connector for attaching the at least one nozzle to the dispersing equipment to enable repositioning of an application angle of said at least one nozzle to create air turbulence impacting said vegetation, and
    a radial magnet provided on an outer surface of the rotatable connector.

2. The apparatus of claim 1, wherein said liquid droplets are within the range of 10 microns to 50 microns and magnetized by the magnetic field of said at least one magnet and plurality of additional magnets.

3. The apparatus of claim 1, wherein said at least one nozzle comprises a reversible nozzle so that the nozzle can be reversed in longitudinal and polar orientation without removing said at least one magnet from the nozzle and further comprises at least one bar or circular shaped magnet exhibiting a magnetic remanence of at least 1.25 Tesla.

4. The apparatus of claim 1, wherein said at least one nozzle includes a connector adapted to fit substantially all types of liquid spray applicators including at least irrigation emitters and sprayers, boom sprayers, backpack sprayers, airplane mounted sprayers, air-carrier sprayers, micro-sprinklers, and foggers, and for low flow volume drip or seep emitters.

5. The apparatus of claim 4, wherein said additional magnets are positioned substantially adjacent to said at least one nozzle when mounted on said liquid spray applicators.

6. The apparatus of claim 1, wherein said at least one magnet and plurality of additional magnets are Neodymium magnets and preferably have a magnetic remanence of at least 1.25 Tesla.

7. The apparatus of claim 1, wherein said at least one magnet and plurality of additional magnets are composite magnets including ceramics or plastics or other material and preferably have a magnetic remanence of at least 1.25 Tesla.

8. A system for applying liquid solutions to vegetation, comprising:
    at least one nozzle for applying liquid in the form of liquid droplets;
    the at least one nozzle comprising a reversible nozzle comprising at least one magnet for applying a magnetic field to said liquid, wherein said at least one reversible nozzle can be reversed in longitudinal and polar orientation without removing said at least one magnet from the nozzle to produce either a north or south monopole effect in the nozzle to separate said liquid droplets;
    at least one additional magnet for applying a magnetic field positioned in close proximity the exit point of said liquid droplets from said at least one nozzle, each of said at least one magnet and said at least one additional magnet having a magnetic remanence of at least 0.9 Tesla;
    wherein said liquid includes at least water, and
    wherein magnetized liquid droplets are dispersed from said at least one nozzle and impact said vegetation, and further comprising:
    a rotatable connector for attaching the reversible nozzle to the dispersing equipment to enable repositioning of an application angle of said reversible nozzle to create air turbulence impacting said vegetation, and
    a radial magnet provided on an outer surface of the rotatable connector.

9. The system of claim 8, wherein said liquid droplets are magnetized by the magnetic field of said at least one magnet and said at least one additional magnet, said at least one magnet forming a tubing material part of said at least one nozzle such that the tubing material defines a tubular conduit in said at least one nozzle.

10. The system of claim 8, further comprising a plurality of nozzles for dispersing liquid in the form of liquid droplets, each nozzle in said plurality of nozzles including at least one magnet having a remanence of at least 0.9 Tesla.

11. The system of claim 8, wherein said at least one magnet and said at least one additional magnet are Neodymium magnets and preferably have a magnetic remanence of at least 1.25 Tesla.

12. The system of claim 8, wherein said at least one magnet and said at least one additional magnet comprises a composite magnet including ceramics or plastics or other material and preferably has a magnetic remanence of at least 1.25 Tesla.

13. The system of claim 8, wherein said at least one reversible nozzle is sized to produce liquid droplets within the range of 10 microns to 30 microns.

14. The system of claim 8, further comprising configuration components including at least a plurality of nozzles for dispersing liquid and a plurality of magnets for applying a magnetic field to said liquid.

15. An apparatus for configuring dispersing equipment for applying liquid solutions to vegetation, comprising:
    a plurality of nozzles sized to produce liquid droplets sized in the range of 10 to 50 microns, and at least one of said nozzles is a reversible nozzle so that the nozzle can be reversed in longitudinal and polar orientation in order to produce either a north or south monopole effect in the nozzle depending on directional orientation, said at least one reversible nozzle comprising at least one magnet forming a tubing material part of said at least one nozzle such that the tubing material defines a tubular conduit in said at least one nozzle and the reversible nozzle is configured to be reversed in longitudinal and polar orientation without removing said at least one magnet from the nozzle;

a plurality of additional magnets for applying a magnetic field to said liquid droplets, each magnet in said at least one magnet and plurality of additional magnets having magnetic remanence of at least 0.9 Tesla;

wherein said reversible nozzle when oriented to produce a south monopole effect is configured to promote increased growth and drought tolerance in said vegetation, wherein said reversible nozzle when oriented to produce a north monopole effect is configured to promote disease resistance in said vegetation, and wherein said liquid includes at least water, and further comprising:

a rotatable connector for attaching the reversible nozzle to the dispersing equipment to enable repositioning of an application angle of said reversible nozzle to create air turbulence impacting said vegetation, and a radial magnet provided on an outer surface of the rotatable connector.

16. The apparatus of claim 1, wherein said at least one nozzle is a trickle-nozzle.

17. The apparatus of claim 1, configured for low flow volume irrigation systems, wherein said apparatus comprises a conduit for transporting the liquid, wherein said plurality of magnets are periodically positioned internally or externally along the conduit along the route of liquid flow.

* * * * *